United States Patent

Schreckenberg et al.

(10) Patent No.: US 8,025,315 B2
(45) Date of Patent: Sep. 27, 2011

(54) FITTING AND JOINING ARRANGMENENT HAVING A FITTING

(75) Inventors: Christoph Schreckenberg, Attendorn (DE); Thorsten Wasserhövel, Arnsberg (DE)

(73) Assignee: Viega GmbH & Co. KG, Attendorn (DE)

( * ) Notice: Subject to any disclaimer, the term of this patent is extended or adjusted under 35 U.S.C. 154(b) by 334 days.

(21) Appl. No.: 12/068,832

(22) Filed: Feb. 12, 2008

(65) Prior Publication Data

US 2008/0197622 A1 Aug. 21, 2008

(30) Foreign Application Priority Data

Feb. 15, 2007 (DE) .................. 10 2007 008 066

(51) Int. Cl.
*F16L 11/12* (2006.01)
(52) U.S. Cl. ................ 285/45; 285/340; 285/248
(58) Field of Classification Search ............ 285/45, 285/340, 374, 257, 248
See application file for complete search history.

(56) References Cited

U.S. PATENT DOCUMENTS

| | | | | |
|---|---|---|---|---|
| 2,503,826 A | * | 4/1950 | Lamont | 285/340 |
| 2,935,343 A | * | 5/1960 | Ellis | 285/374 |
| 4,362,323 A | | 12/1982 | Lodder et al. | |
| 5,174,611 A | * | 12/1992 | Byrd et al. | 285/45 |
| 5,911,443 A | * | 6/1999 | Le Quere | 285/340 |
| 6,877,777 B1 | * | 4/2005 | Wartluft | 285/239 |
| 7,063,359 B2 | * | 6/2006 | Vallee | 285/308 |
| 7,533,908 B2 | * | 5/2009 | Vogel et al. | 285/314 |

FOREIGN PATENT DOCUMENTS

| | | |
|---|---|---|
| DE | 94 00 545.1 | 6/1995 |
| DE | 196 54 435 | 7/1998 |
| DE | 100 65 225 | 7/2002 |
| EP | 0 390 746 | 10/1990 |
| EP | 1 081 423 | 3/2001 |
| EP | 1 219 883 | 7/2002 |
| EP | 1 533 555 | 5/2005 |
| SE | 7312793 | 3/1975 |
| WO | 2004/015317 | 2/2004 |

\* cited by examiner

*Primary Examiner* — David E Bochna
(74) *Attorney, Agent, or Firm* — Barnes & Thornburg LLP

(57) ABSTRACT

A fitting for connection with a pipe end configured to have a medium flow therethrough, the fitting including a connecting section having a circumferentially-extending groove, a sealing element arranged in the grove, and a protection sleeve configured to be arranged over the groove and displaceable between a first position and a second position. The first position of the protection sleeve covers the groove at least partially and the second position of the protection sleeve exposes the groove at least partially. An amount of exposure of the groove is greater in the second position than an amount of exposure of the groove in the first position.

35 Claims, 4 Drawing Sheets

FITTING AND JOINING ARRANGMENENT HAVING A FITTING

BACKGROUND AND SUMMARY

The present disclosure relates to a fitting, in, for example, the installation field. The fitting is for connection with an end of a pipe through which a medium can flow. The fitting includes a connecting section with a circumferentially extending groove in which a sealing element is arranged. The present disclosure also relates to a corresponding joining arrangement, for example, also for the installation field. The joining arrangement includes a fitting and an end of a pipe through which a medium can flow, which end is connected with the fitting. The present disclosure also relates to a corresponding process for the production of a joining arrangement, for example, for the installation field. A fitting is provided which has a connecting section having a circumferentially extending groove, and a sealing element being arranged in the groove.

A fitting of the above-mentioned type is used for connecting with an end of a pipe through which a medium can flow. A sealing element extends in a groove at the fitting in a connecting section. In the mounted condition, that is, in the case of a finished joining arrangement, this sealing element has a sealing effect with respect to the pipe end and with respect to the bottom of the groove.

Generally, in the case of a joining arrangement of the above-described type, the pipe end is pushed in the axial direction over the connecting section and the sealing element situated in the groove. While this is taking place or subsequently, the pipe end is axially fixed against an unintentional pulling-out. For this purpose, for example, a cutting element is provided which cuts into the wall of the pipe end. This is customary in the case of a plug-type joining where the pipe end is only fitted onto or into the fitting and is thereby automatically fixed. However, it is within the scope of the present disclosure to secure the pipe end, which is pushed onto or into the fitting, by compression joining, during which a pressure sleeve is compressed in a pressing tool, against an axial pushing-out.

However, in both cases mentioned above, it is problematic that, when the pipe end is pushed onto the connecting section of the fitting, the sealing element, generally, projects partially out of the groove, is damaged or destroyed. Also, during the pushing-on of the pipe end, the sealing element may be pressed out of the groove. The results are leaks within the system.

The present disclosure relates to a fitting wherein an optimal tightness is ensured for the long term.

According to an embodiment of the present disclosure, a fitting includes a protection sleeve which can be displaced in the axial direction between a first position and a second position. In the first position, the protection sleeve covers the groove at least partially and, in the second position, releases or exposes the groove at least partially. The groove may be arranged in the interior of the connecting section as well as in a surrounding manner on the outside on the connecting section. Correspondingly, the protection sleeve may be arranged in the interior of the connecting section or on the outside on the connecting section.

A fitting, according to the present disclosure, may be made, for example, of a plastic material or of metal. The sealing element may be completely covered in the first position of the protection sleeve. Furthermore, it may be provided that the groove is completely covered in the first position. As used herein, "completely covered" is a covering at least in the radial direction.

An advantage for an at least partial covering, is that the sealing element is protected from damage, destruction or displacement when the pipe is pushed on or in. That is because the front end of the pipe does not come in contact with the sealing element. According to the present disclosure, during the pushing-on or pushing-in of the pipe end, the sealing element is released or exposed only when the front of the pipe end has passed the sealing element in the groove in the axial direction. The reason is that, as a result of the pushing-on or pushing-in of the pipe end, the pipe is first pushed onto the protection sleeve. Thus, the movement of the pipe end is transmitted to the protection sleeve, so that the front end of the pipe, while being spaced away from the sealing element, is guided away over the latter. After a certain axial displacement of the protection sleeve, the sealing element is then released and comes into a sealing contact with the pipe wall.

Another advantage of the covering of the groove or of the sealing element, such as when it is a complete covering, is an improved protection against contamination. Thus, when storing fittings and particularly when handling fittings on construction sites, dirt particles may penetrate into the groove of the connecting section. As is known in the prior art, such dirt particles result in an increased risk of leakages. This is prevented, according to the present disclosure, by the covering of the groove or of the sealing element.

As described above, during the pushing-on or pushing-in of the pipe end in the second position of the protection sleeve, the groove is at least partially released or exposed just far enough that the sealing element relaxes and comes in a sealing contact with the pipe end. An effective sealing is achieved especially when the sealing element is completely released in the second position. In such a case, the groove can also be completely released in the second position. In this manner, an optimal contact of the sealing element on the wall of the pipe is made possible. The sealing element may be a sealing ring, such as, for example, an O-ring.

According to a further embodiment of a fitting, according to the present disclosure, the protection sleeve has a device which interacts with the pipe end such that a movement of the pipe end relative to the connecting section can be transmitted to the protection sleeve. In this manner, as soon as the pipe end has been pushed onto the protection sleeve, the protection sleeve cannot be pushed manually in the axial direction into the second position but this can take place automatically by the mere movement of the pipe end. For this purpose, the device may be a stop constructed on, for example, or molded onto the protection sleeve. It is within the scope of the present disclosure to provide a corresponding stop at the pipe end which transmits the movement of the pipe end to the protection sleeve. The molding-on or forming of a stop directly on the protection sleeve, however, requires fewer expenditures.

The stop may, for example, be formed by a radial widening or narrowing of an end of the protection sleeve, such as in a cross-sectionally curved course. It is within the scope of the present disclosure to construct the protection sleeve in a conical shape at least in sections. The protection sleeve as a whole, that is, along its entire length, may also have a conical course. A stop in the shape of a radial widening or narrowing has an advantage that the pushing-on or pushing-in of the protection sleeve into the area of the connecting section is simplified, such as when a certain pressure is to be exercised on the sealing element. A radially expanded or contracted end or a course of the protection sleeve which is conical at least in sections has an advantage that, for a finished joining arrangement, or a completely pushed-on or pushed-in pipe end, a clamping of the pipe in the fitting is caused or at least aided. It is within the scope of the present disclosure to construct the protection sleeve partially, such as completely cylindrically, and to provide a cross-sectional expansion or contraction, such as a surrounding shoulder, as the stop.

According to an embodiment of the fitting according to the present disclosure, the protection sleeve can be displaced between the first position and the second position by a translatory movement. It is within the scope of the present disclosure that, in addition, a rotatory movement is used or required in order to displace the protection sleeve from the first into the second position.

According to an embodiment of the present disclosure, a securing of the protection sleeve against an unintentional displacement is provided. In other words, during the handling of the fitting, for example, during its production or later at the construction site, it is avoided that the sealing element or the groove in the connecting section of the fitting are unintentionally released and/or exposed to damaging environmental influences. A securing also prevents an unintentional losing of the protection sleeve. A securing is possible, for example, in that the protection sleeve is applied under tension, such as a slight press fit, to the connecting section or is inserted into the latter. It is within the scope of the present disclosure to shrink on the protection sleeve. Another possibility of a securing with respect to an unintentional displacement is increasing the frictional resistance between the protection sleeve and the connecting section. In other words, the frictional resistance permits a displacement of the protection sleeve only under a predetermined pressure in the axial direction. In order to increase the frictional resistance with respect to the original surface or with respect to other surface sections of the fitting, the surface of the protection sleeve and/or of the connecting section may, for example, be roughened at least in sections or be provided with an axial stop, such as at the end facing the pipe end.

According to an embodiment of the fitting of the present disclosure, the sealing element can be compressed by the protection sleeve in the first position in the radial direction. It is within the scope of the present disclosure that the sealing element can be compressed by displacing the protection sleeve into the first and/or the second position. In last-mentioned example, the protection sleeve has a section which, in the first position in the radial direction, is arranged over the sealing element and is constructed such that the sealing element is less compressed than in another position. In this manner, it is ensured that, at least during the pushing-on or pushing-in of the pipe end and the subsequent displacement of the protection sleeve, the sealing element is pressed so far into the groove that it cannot be damaged or destroyed by the pipe end. Before the pushing-on or pushing-in of the pipe, it is, however, not absolutely necessary that the sealing element is kept permanently deformed. On the contrary, the service life of the sealing element is clearly increased when the sealing element, although it is covered, is nevertheless relaxed or at least partially relaxed.

The section of the protection sleeve which causes an at least partial relaxing of the sealing element in the condition in which the pipe is not yet pushed on or in may, for example, have a flexible construction. It is within the scope of the present disclosure to provide one or more slots in this section. A cross-sectional expansion or contraction may also be provided in the section. The section may have a conical construction, in which case the cone may be simultaneously used as the stop for the pipe end. All these devices make it possible that the sealing element is as relieved as possible in the not yet installed condition but is nevertheless protected at the point in time of the pushing-on or pushing in of the pipe end with respect to the latter.

According to an embodiment of the present disclosure, the fitting has a sleeve-shaped cap which surrounds the connecting section at a predetermined distance. Thus, the pipe end can be pushed in between the connecting section and the sleeve-shaped cap. On the one hand, such a sleeve-shaped cap is use as a guide of the pipe end and, on the other hand, permits also the axial fixing, for example, by locking. The axial fixing can be achieved, for example, in that the sleeve-shaped cap has a cutting element on the interior side. As a result of a simultaneous effect of the stop on the protection sleeve, on the one hand, and of the cutting element, on the other hand, the pipe end can be optimally locked in the fitting.

It should be pointed out that, at the point in time at which the pipe end is pushed onto the connecting section, the protection sleeve does not yet necessarily have to be in the first position, in which the groove is at least partially covered. The protection sleeve may, at the beginning of the sliding-on of the pipe end, relative to the sliding direction, also be arranged in front of the first position, thus in front of the groove, and may only as a result of the displacing of the pipe end be moved from this starting position into the first position. It is, therefore, not necessarily required that, at the moment at which the sliding-on of the pipe section starts, the protection sleeve is already in the first position. But, for example, it must only be ensured that the protection sleeve initially is in a position which prevents the pipe end from coming in contact with the sealing element when the pipe end is pushed over the groove. Thus, it is provided, according to another embodiment of the fitting of the present disclosure, that the protection sleeve can be moved into the first position and/or into the second position by the displacement of the pipe end. The protection sleeve may already be in the first position at the beginning of the slide-on operation and already covers the groove and, as required, the sealing element at least partially.

The present disclosure also relates to a joining arrangement having a fitting as described above.

According to the present disclosure, the fitting ensures that, for example, in the case of an at least partial covering, when the pipe is pushed on or in, the sealing element is protected from damage, destruction or displacement. Thus, a tightness of the joining arrangement is achieved that is high for a long time.

The present disclosure also relates to a process wherein a protection sleeve is arranged in a first position on the connecting section, which covers the groove at least partially, and an end of a pipe is pushed onto or into the connecting section. In such a case, the protection sleeve is displaced in the axial direction into a second position in which the groove is at least partially released or exposed.

The process, according to the present disclosure, includes an advantage that, for an at least partial covering, during the pushing-on or pushing-in of the pipe, the sealing element is protected against damage, destruction and displacement. This leads, for example, to an improved tightness of the joining arrangement.

According to an embodiment of the process according to the present disclosure, in the first position, the sealing element is covered by the protection sleeve and, in the second position, is released by the protection sleeve to such an extent that the sealing element relaxes and comes in a sealing contact with the pipe end.

Before the pushing onto the pipe end, the protection sleeve may also be arranged in front of the groove, and thus in front of the first position. Then the protection sleeve, during a further pushing of the pipe end onto the connecting section, is first moved into the first position and subsequently into the second position. Correspondingly, according to another embodiment of the process of the present disclosure, it is provided that the protection sleeve is moved into the first and/or into the second position by the displacement of the pipe end.

Other aspects of the present disclosure will become apparent from the following descriptions when considered in conjunction with the accompanying drawings.

DETAILED DESCRIPTION

Figure 1:
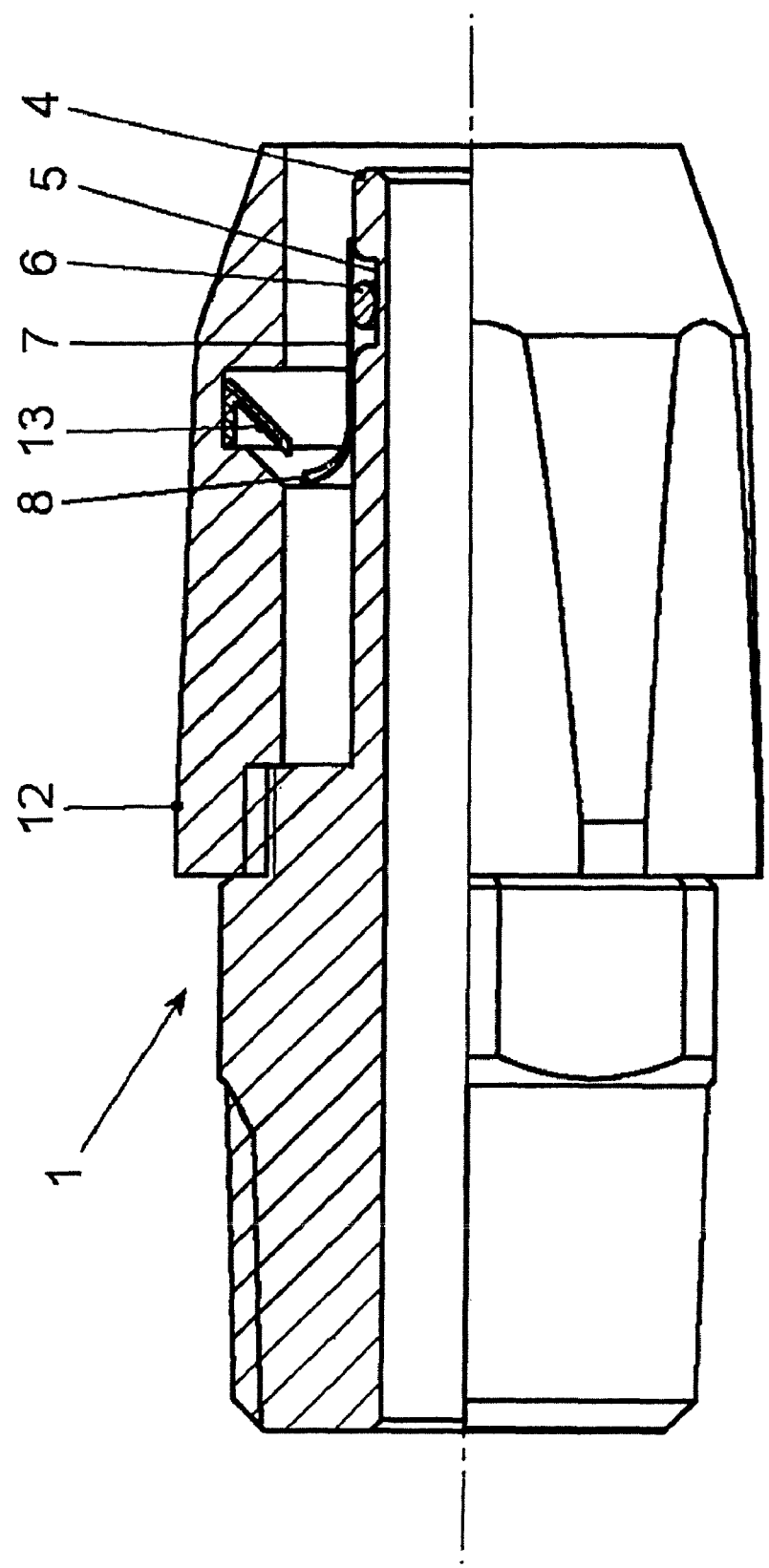
FIG. 1 is a partial sectional view of a fitting, according to an embodiment of the present disclosure.

FIG. 1 is a fitting 1 made, for example, of a plastic material for the connection with an end 2 of a pipe 3 through which a medium can flow. Fitting 1 includes a connecting section 4 which has a circumferentially extending groove 5. An O-ring, for example, is arranged in the groove 5 as a sealing element 6.

A sleeve-shaped cap 12, which is fixedly screwed to the fitting 1, is provided around the connecting section 4. A ring-shaped receiving space for the end 2 of the pipe 3 is constructed between the sleeve-shaped cap 12 and the connecting section 4.

For protecting the sealing element 6, a protection sleeve 7 is provided which, for example, may be preassembled at the factory. Sleeve 7 may be placed on almost any type of fitting.

Figure 3:
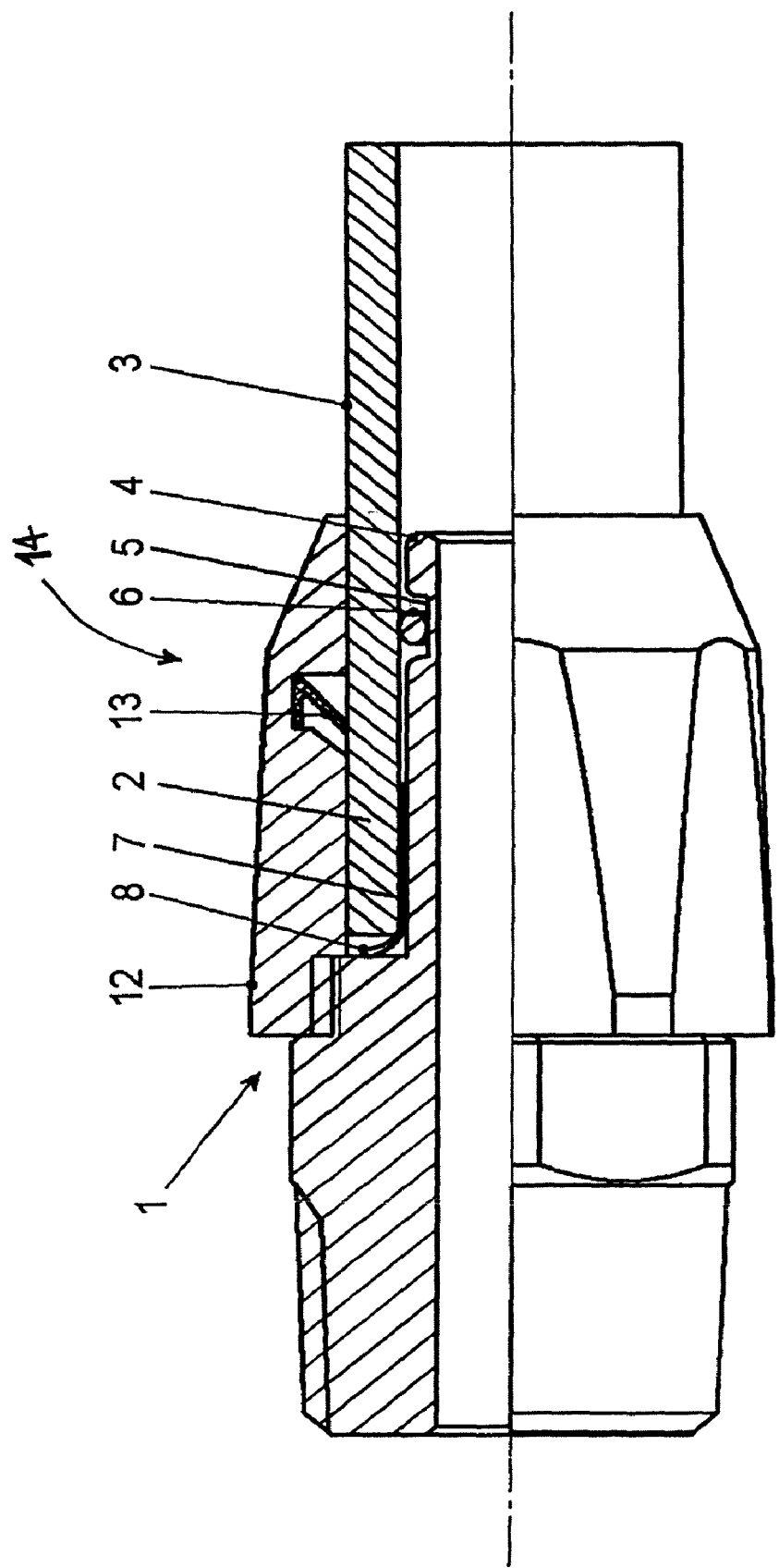
FIG. 3 is a partial sectional view of a joining arrangement, according to the present disclosure and including the fitting of FIG. 1.

The protection sleeve 7 can be, for example, displaced in an axial direction between a first position at least partially covering groove 5 and a second position at least partially exposing groove 6 and/or sealing element 5. As shown in FIG. 1, the protection sleeve 7 is in the first position, for example, completely covering the groove 5 and the sealing element 6. As shown in FIG. 3, the sleeve 7 is in the second position completely releasing or exposing the sealing element 6 and groove 5.

The embodiment of protection sleeve 7 shown in FIG. 1 includes a cylindrical section and a radially expanded end. In the first position of protection sleeve 7 shown in FIG. 1, the cylindrical section is arranged in the radial direction over the sealing element 6, such that the sealing element 6 is compressed in the groove 5.

Figure 2:
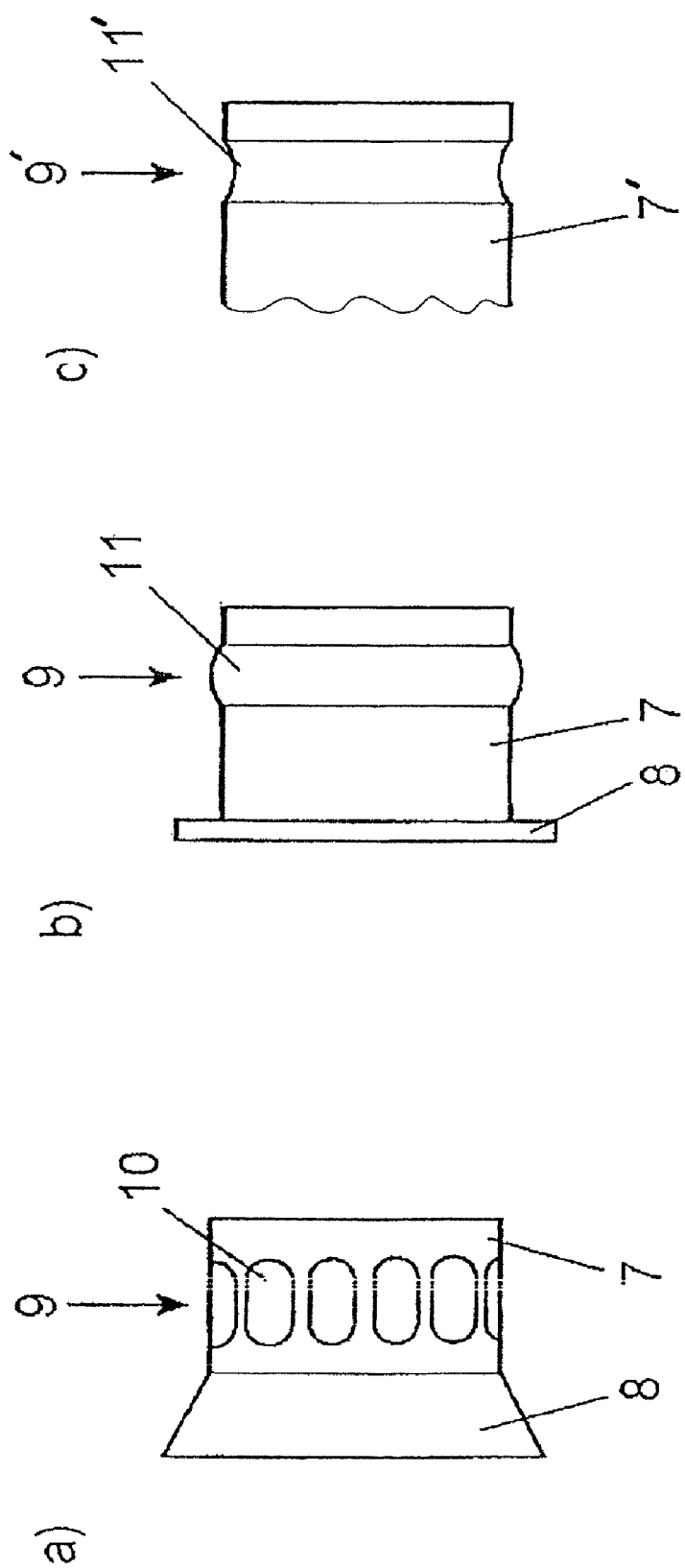
FIGS. 2a) and 2b) are views of embodiments of a protection sleeve for the fitting of FIG. 1.

However, other embodiments are within the scope of the present disclosure in which the protection sleeve 7 has a section 9 (see FIG. 2 a) and 2b)) which, in the first position of sleeve 7, is arranged in the radial direction over the sealing element 6 and is constructed such that the sealing element 6 is less compressed than shown in FIG. 1.

According to FIG. 2a), section 9 may, for example, have several slots 10 which may result in a weakening of the material and thus cause a certain relaxation of the sealing element 6 as long as section 9 is arranged in the radial direction over the sealing element 6. As soon as the protection sleeve 7 is then displaced into the second position, as shown, for example, in FIG. 3, the sealing element 6 is temporarily again compressed such that it is protected from the pipe end 2.

Another embodiment of a protection sleeve 7 having a section 9 is shown in FIG. 2b) where a cross-sectional expansion 11 is provided in section 9. Section 9 is situated, or suggested to be situated, in the first position of sleeve 7 in the radial direction over the sealing element 6. This cross-sectional expansion 11 also has an effect such that the sealing element 6 is compressed when the pipe end 2 is pushed in (as suggested in FIG. 3), but is otherwise essentially relaxed. This increases the service life of the sealing element 6. Another embodiment of a protection sleeve 7' having a section 9' is shown in FIG. 2c) where a cross-sectional contraction 11' is provided in section 9'. This cross-sectional contraction 11' has an effect such that the sealing element 6 is compressed when the pipe end is pushed in (as suggested in FIG. 4b)), but is otherwise relaxed. This increases the service life of the sealing element 6.

As already described regarding FIG. 1, the protection sleeve 7 has a radially expanded end. This end forms a stop 8 for engaging a front end of the pipe 3, so that when a joining arrangement 14 is established, as shown, for example, in FIG. 3, the protection sleeve 7 is automatically displaced by the pipe end 2, in the slide-in direction of the pipe end 2, into the second position of sleeve 7. In this second position, the groove 5 and the sealing element 6 arranged therein are completely released, or exposed to the pipe end 2 such that the sealing element 6 is relaxed and comes into a sealing contact with the pipe end 2, on an interior side of pipe end 2.

In addition to a radial widening in a curved shape, as shown in FIG. 1, the protection sleeve 7 may have a partially conical course or shape, as shown in FIG. 2a), configured as a stop 8.

As shown in FIG. 2b), the stop 8 may also be formed by a surrounding shoulder with an enlarged cross-section.

FIG. 3 shows a finished joining arrangement 14 in which the pipe end 2 is introduced into the fitting 1. During the introduction of the pipe end 2, the protection sleeve 7 has the effect that the pipe end 2 is at first pushed in the axial direction onto the protection sleeve 7 up to the stop 8. Subsequently, the axial push-in movement of the pipe end 2 is transmitted by way of the stop 8 to the protection sleeve 7. As a result, when the pipe end 2 is introduced further into the fitting 1, the protection sleeve 7 is moved from its original first position into the second position, in which the sealing element 6 is released. The sealing element 6 thereby relaxes and enters into a sealing contact with the pipe end 2 without the possibility that the front end of the pipe end 2 could damage, destroy or displace the sealing element 6 during the pushing-in.

FIG. 3 also shows that the sleeve-shaped cap 12 has a cutting element 13 on an interior side, which is used as an axial fixation or fixing against an unintentional pulling-out of the pipe end 2. By the expanded stop 8, on the one hand, and the cutting element 13, on the other hand, an optimal locking of the pipe end 2 in the fitting 1 is also provided.

Figure 4:
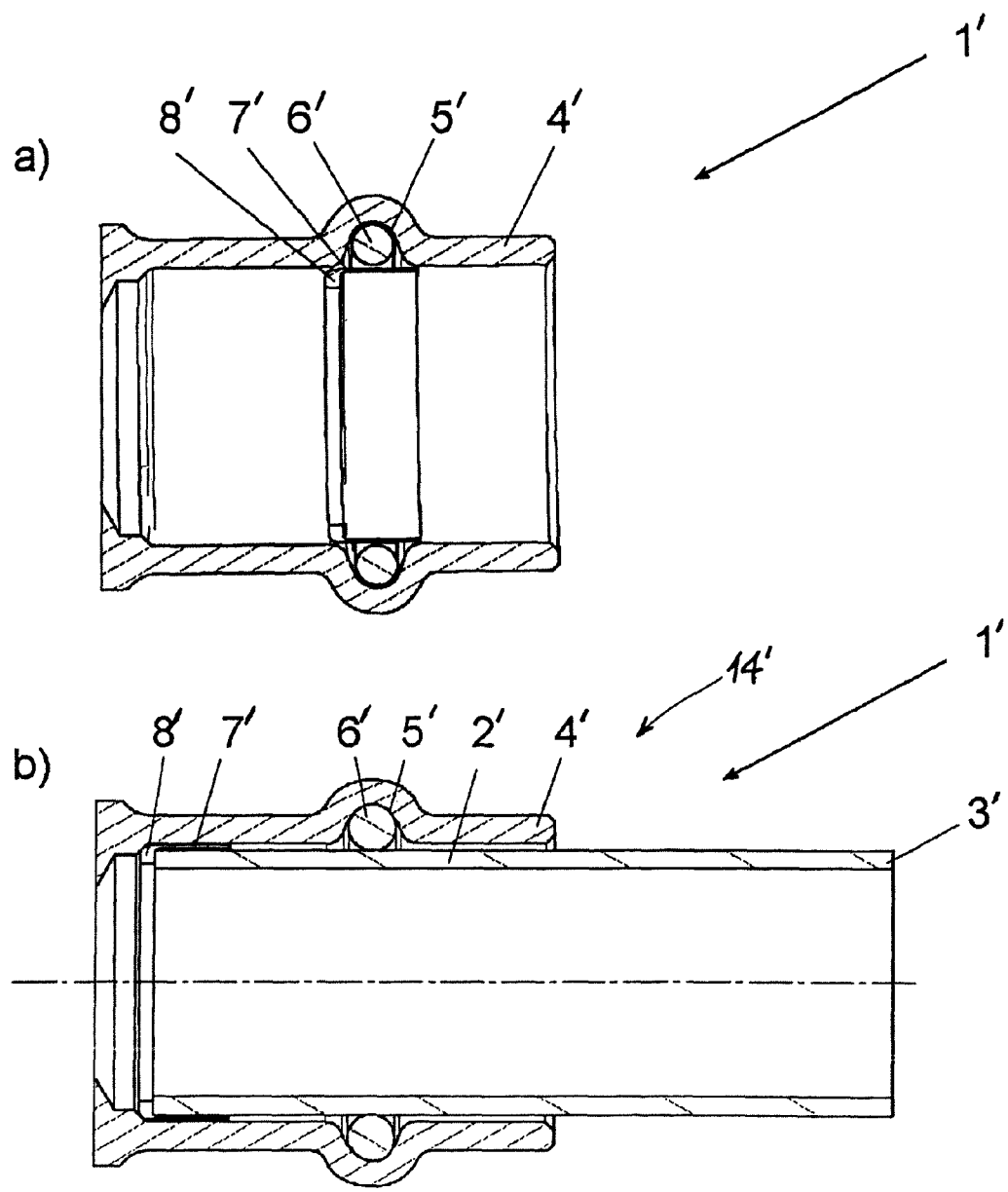
FIGS. 4a) and 4b) are views of a fitting, according to another embodiment of the present disclosure and a corresponding joining arrangement, according to the present disclosure.

FIG. 4a) shows another embodiment of a fitting 1' according to the present disclosure. The fitting 1' is used for the connection with an end 2' of a pipe 3' through which a medium can flow. Fitting 1' includes a connecting section 4' which has a circumferentially extending groove 5'. An O-ring, for example, is arranged as a sealing element 6' in the groove 5'.

However, in contrast to the embodiment in FIG. 1, in the embodiment of FIGS. 4a) and 4b), the groove 5' is arranged in a surrounding manner in an interior of the connecting section 4'.

Correspondingly, a protection sleeve 7' is arranged on the interior side of connection section 4' for the protection of the sealing element 6'. This protection sleeve 7' may be preassembled at the factory but can also be used subsequently in almost any fitting.

The protection sleeve 7' can be displaced in the axial direction between a first position and a second position. As shown, when viewing FIGS. 4a) and 4b), the protection sleeve 7' completely covers the groove 5' and the sealing element 6' in the first position of sleeve 7' (see FIG. 4a)) and completely releases or exposes groove 5' and sealing element 6' in the second position of sleeve 7' (see FIG. 4b)). As just noted, FIG. 4a) shows the first position of sleeve 7', whereas FIG. 4b) shows the second position of sleeve 7'.

The embodiment, according to the present disclosure, of protection sleeve 7' in FIGS. 4a) and b) has a cylindrical section as well as a radially contracted end in the form of a surrounding shoulder. In the first position of sleeve 7', shown in FIG. 4a), the cylindrical section is arranged in the radial direction over the sealing element 6', such that the sealing element 6' is not compressed in the groove 5'. The end of the protection sleeve 7' contracted in the radial direction forms a stop 8' for the front end of the pipe pushed into the fitting 1'. The result is that, when a joining arrangement 14' is established, as shown in FIG. 4b), the protection sleeve 7' is automatically displaced by the pipe end 2' in the push-in direction of the pipe end 2' into the second position of sleeve 7'. In this second position, the groove 5' and the sealing element 6' arranged therein are completely exposed or released, such that the sealing element 6' enters into a sealing contact with the pipe end 2', by its exterior side. This may occur, for example, when the fitting 1', in the area of the groove 5', is cold-formed by a pressing tool (not shown) in the radial direction.

FIG. 4b) shows the condition after the pushing-in of the pipe end 2' after the pressing by the pressing tool. When comparing FIG. 4a) with FIG. 4b), it should be recognized that the sealing element 6' enters into a sealing contact with the pipe end 2' only after the pressing. In contrast, in the condition shown in FIG. 4a), the sealing element 6' is arranged to be set back so far in the radial direction that it does not project beyond the groove 5' toward the interior. In this case, the protection sleeve 7' is used for the optimal protection of the sealing element 6' against damaging environmental influences, such as dirt, water, UV radiation, etc.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A fitting for connection with a pipe end configured to have a medium flow therethrough, the fitting comprising:
   a connecting section having a circumferentially-extending groove;
   a sealing element arranged in the groove;
   a protection sleeve configured to be arranged over the groove and displaceable between a first position and a second position;
   wherein the first position the protection sleeve covers the groove and in the second position the protection sleeve exposes the groove at least partially, and an amount of exposure of the groove is greater in the second position than an amount of exposure of the groove in the first position;
   wherein the protection sleeve includes a stop, which stop is configured to interact with the pipe end to move the protection sleeve relative to the connecting section; and
   wherein the protection sleeve includes one of a radial expansion and a radial contraction formed thereon engaging the pipe end.

2. The fitting according to claim 1, wherein, in the first position of the protection sleeve, the sealing element is completely covered.

3. The fitting according to claim 1, wherein, in the first position of the protection sleeve, the groove is completely covered.

4. The fitting according to claim 1, wherein, in the second position of the protection sleeve, the sealing element is completely exposed.

5. The fitting according to claim 1, wherein, in the second position of the protection sleeve, the groove is completely exposed.

6. The fitting according to claim 1, wherein the sealing element is a sealing ring.

7. The fitting according to claim 1, wherein the protection sleeve is displaced between the first position and the second position by a translatory movement.

8. The fitting according to claim 1, wherein the protection sleeve is displaced between the first position and the second position by a rotatory movement.

9. The fitting according to claim 1, wherein the protection sleeve is secured against an unintentional displacement.

10. The fitting according to claim 9, wherein the protection sleeve is secured on the connecting section under tension.

11. The fitting according to claim 9, wherein the protection sleeve is secured by a frictional resistance between the protection sleeve and the connecting section.

12. The fitting according to claim 11, wherein the protection sleeve includes an axial stop at an end of the protection sleeve facing an end of the pipe.

13. The fitting according to claim 1, wherein the sealing element is compressed in a radial direction by the sleeve in the first position.

14. The fitting according to claim 1, wherein the sealing element is compressed by displacing the protection sleeve into the first position.

15. The fitting according to claim 14, wherein the protection sleeve has a section which, in the first position of the sleeve, is arranged in a radial direction next to the sealing element and is constructed such that the sealing element is less compressed than in another position of the sleeve.

16. The fitting according to claim 15, wherein the section is flexible.

17. The fitting according to claim 15, wherein the section has one or more slots.

18. The fitting according to claim 15, wherein the section includes a cross-sectional expansion.

19. The fitting according to claim 15, wherein the section includes a cross-sectional contraction.

20. The fitting according to claim 1, further including a sleeve-shaped cap which surrounds the connecting section at a predetermined distance, the pipe end being pushable between the connecting section and the sleeve-shaped cap.

21. The fitting according to claim 20, wherein the sleeve-shaped cap includes a cutting element on an interior side, which cutting element secures the pipe end in a pushed-on condition against a pulling-out in the axial direction.

22. The fitting according to claim 1, wherein the protection sleeve is configured to be moved into the first position by displacement of the pipe end.

23. The fitting according to claim 1, wherein the sealing element is an O-ring.

24. The fitting according to claim 1, wherein the stop is molded onto the protection sleeve.

25. The fitting according to claim 1, wherein the radial contraction is formed of an end of the protection sleeve.

26. The fitting of claim 1, wherein the protection sleeve is configured to be moved into the second position by displacement of the pipe end.

27. The fitting according to claim 1, wherein the stop is conically shaped and forms the radial expansion.

28. A joining arrangement comprising:
a fitting including a connecting section having a circumferentially-extending groove, a sealing element arranged in the groove, and a protection sleeve configured to be arranged in the groove and displaceable between a first position wherein the protection sleeve covers the groove and a second position wherein the protection sleeve exposes the groove at least partially, and an amount of exposure of the groove is greater in the second position than an amount of exposure of the groove in the first position;
a pipe configured to allow a medium to flow therethrough, the pipe having an end connected to the fitting,
wherein the protection sleeve includes a stop, which stop is configured to interact with the pipe end to move the protection sleeve relative to the connecting section; and
wherein the protection sleeve includes one of a radial expansion and a radial contraction formed thereon engaging the pipe end.

29. A method for producing a joining arrangement, the joining arrangement including a fitting having a connecting section with a circumferentially-extending groove and a sealing element arranged in the groove, the method steps comprising:
providing a protection sleeve arranged in a first position on the connecting section covering the groove;
pushing a pipe end one of onto and into the connecting section;
displacing the protection sleeve in an axial direction to a second position in which the groove is at least partially exposed; and
wherein in the first position the protection sleeve covers the groove at least partially and in the second position the protection sleeve exposes the groove at least partially, and an amount of exposure of the groove is greater in the second position than an amount of exposure of the groove in the first position; and
wherein the pipe end interacts with a stop of the protection sleeve, which stop has a conical shape at least in sections, and interaction of the stop with the pipe end and a cutting element interacting with the pipe end cause a clamping of the pipe in the fitting and produces the joining arrangement.

30. The method according to claim 29, wherein the sealing element is covered by the protection sleeve in the first position, and is released by the protection sleeve in the second position to such an extent that the sealing element relaxes and enters into a sealing contact with the pipe end.

31. The method according to claim 29, wherein the protection sleeve is moved into the first position by a movement of the pipe end.

32. The method of claim 29, wherein the protection sleeve is moved to the second position by a movement of the pipe end.

33. A fitting for connection with a pipe end configured to have a medium flow therethrough, the fitting comprising:
a connecting section having a circumferentially-extending groove;
a sealing element arranged in the groove;
a protection sleeve configured to be arranged over the groove and displaceable between a first position and a second position;
wherein in the first position the protection sleeve covers the groove and in the second position the protection sleeve exposes the groove at least partially, and an amount of exposure of the groove is greater in the second position than an amount of exposure of the groove in the first position;
wherein the protection sleeve includes a stop, which stop is configured to interact with the pipe end to move the protection sleeve relative to the connecting section; and
wherein the stop has a cross-sectionally curved shape at the side of the stop facing the pipe end when pipe end is inserted.

34. A joining arrangement comprising:
a fitting including a connecting section having a circumferentially-extending groove, a sealing element arranged in the groove, and a protection sleeve configured to be arranged in the groove and displaceable between a first position wherein the protection sleeve covers the groove and a second position wherein the protection sleeve exposes the groove at least partially, and an amount of exposure of the groove is greater in the second position than an amount of exposure of the groove in the first position;
a pipe configured to allow a medium to flow therethrough, the pipe having an end connected to the fitting;
wherein the protection sleeve includes a stop, which stop is configured to interact with the pipe end to move the protection sleeve relative to the connecting section; and
wherein the stop has a cross-sectionally curved shape at the side of the stop facing the pipe end when pipe end is inserted.

35. A method for producing a joining arrangement, the joining arrangement including a fitting having a connecting section with a circumferentially-extending groove and a sealing element arranged in the groove, the method steps comprising:
providing a protection sleeve arranged in a first position on the connecting section covering the groove at least partially;
pushing a pipe end one of onto and into the connecting section;
displacing the protection sleeve in an axial direction to a second position in which the groove is at least partially exposed;
wherein in the first position the protection sleeve covers the groove at least partially and in the second position the protection sleeve exposes the groove at least partially, and an amount of exposure of the groove is greater in the second position than an amount of exposure of the groove in the first position; and
wherein the pipe end interacts with a stop of the protection sleeve, which stop has a cross-sectionally curved shape, and interaction of the stop with the pipe end and a cutting element interacting with the pipe end cause a clamping of the pipe in the fitting and produces the joining arrangement.

* * * * *